Patented Mar. 5, 1929.

1,704,494

UNITED STATES PATENT OFFICE.

FRIEDRICH BOEDECKER, OF BERLIN-DAHLEM, GERMANY.

PROCESS FOR PRODUCING 1-PROPENYL-3-ETHOXY-4-HYDROXY-BENZENE.

No Drawing. Application filed November 19, 1927, Serial No. 234,558, and in Germany February 14, 1927.

This invention relates to the manufacture of 1-propenyl-3-ethoxy-4-hydoxybenzene hereafter, for the sake of shortness, called homo-i-eugenol from which by oxydation a valuable odoriferous substance, the m-ethyl-protocatechuic aldehyde or "homo-vanillin" may be obtained.

In my copending application Ser. No. 146,850 I described a process for transforming safrol into vanillin and for transforming the i-chavibetol formed in this process, besides i-eugenol, into vanillin to a large extent. Now I have found that such i-chavibetol may advantageously be utilized for producing 1-propenyl-3-ethoxy-4-hydroxybenzene from which the above-named homo-vanillin may be obtained by well-known methods.

For this purpose the i-chavibetol is transformed, for instance, by means of ethyl chloride, into its ethyl ether, and the latter is split up by means of an alkali. This may be effected, for instance, by heating with aqueous or alcoholic alkali solution. The best output however is obtained by using solutions of alkali metal alcoholates in strong, preferably absolute alcohol. In this case not only a far smaller excess of splitting agent is needed which is to be recommended in any case, but moreover the output is considerably increased, so that advantages are obtained in two directions. By this reaction the methyl and the ethyl groups are not split off with the same readiness, but the methyl radical is eliminated to a far greater extent. This occurs in an extraordinary degree when ethyl alcohol is used as the alcoholic component, whether the splitting is effected in an aqueous-alcoholic medium or by means of alcoholic alcoholate solutions. This is of special importance because by oxidizing the 1-propenyl-3-ethoxy-4-hydroxybenzene the next higher homologue of vanillin is formed known to be a valuable odoriferous substance.

The 3-ethyl ether obtained by the splitting operation may be separated from the 4-methyl ether by recrystallization. This separation is most easily effected by the way of the alkali metal salts or the acylated compounds, as the said derivatives of the ethyl ether are less soluble in the usual solvents than the corresponding derivatives of the 4-methyl ether.

In connection with the process described in my above mentioned copending application the present process enables me to transform safrol at once into two valuable odoriferous substances.

*Examples.*

1. 145 grams of i-chavibetol are dissolved in 500 c. c. of an 11% alcoholic caustic potash solution and, with the addition of 110 grams of ethyl bromide, heated in a stirring-autoclave to about 90° C. for 4 hours. Thereupon the alcohol is distilled off and the residue is dissolved in water. The ethyl-methyl ether which separates in crystalline form is filtered off by suction and washed with diluted caustic soda solution and water. It may be purified by recrystallization from benzin or by distillation. The output approximates the theoretical possible amount. Fusing point 50–51° C.; boiling point 145–148° at 14 mm.

240 grams of the methyl-ethyl ether are heated in a stirring-autoclave with 230 grams of caustic soda and 500 c. c. of ethyl alcohol for about 20 hours to 140–150° C. After cooling-down, the reaction product having solidified to a sludge of crystals is dissolved in water; the solution is shaken with benzene to remove the undecomposed methyl-ethyl ether and then the aqueous alkaline solution is acidified. The separated oil is dissolved in benzene and washed with water. After distilling off the benzene, the residue distils in vacuo (13 mm.) at 145–150° C. It consists of a mixture of a little i-chavibetol with much homo-i-eugenol. In order to obtain therefrom pure homo-eugenol, for instance, 122 grams of the distillate are dissolved in 210 c. c. of a caustic soda solution of about 15%. On cooling-down, the sodium salt crystallizes out in thick prisms; it is filtered off by suction and washed with a sodium chloride solution. By suspending the salt in water and acidifying the phenol may be set free. About 90 grams of homo-i-eugenol are obtained giving a benzoate that shows a fusing point of 83–85° C. whereas the pure benzoate melts at 89° C.

The mother liquor from the sodium salt contains an abundant amount of i-chavibetol.

2. A solution of 288 grams of i-chavibetol ethyl ether in a sodium alcoholate solution obtained by dissolving 50 grams of sodium in 650 c. c. of absolute ethyl alcohol is heated in a stirring autoclave to 150–155° C. for 24 hours. Then the alcohol is distilled off and the residue dissolved in water. For removing the unsplit ether the aqueous solution is shaken several times with benzene. The benzene extract leaves on distilling off the solvent 45 grams of unsplit i-chavibetol ether.

The aqueous alkaline solution is acidulated, the precipitating oil dissolved in benzene and the benzene solution washed with water. After distilling off the benzene 210 grams of a product remain from which by distilling in vacuo 180 grams of an oil (boiling at 148–152° C. at 13 mm.) are separated which solidifies to a soft mass of crystals. To obtain therefrom the pure m-ether of propenyl-pyrocatechine, the product is dissolved in 360 c. c. of a hot 12.5% caustic soda solution. On cooling down, the sodium salt of the ethyl ether crystallizes out, a small amount of sodium i-chavibetolate remaining dissolved. By decomposing the crystallized and separated sodium salt the white ethyl ether is obtained which on crystallizing from hexany-drotoluene solution has a fusing-point of 55° C.

The homo-i-eugenol may be converted into the 3-ethyl ether of protocatechuic aldehyde (homo-vanillin) in the well-known manner, for instance, by oxidizing it with ozone.

I claim:—

1. Process for producing 1-propenyl-3-ethoxy-4-hydroxybenzene which comprises ethylating i-chavibetol, subjecting the resulting 3-ethyl-4-methyl ether to the action of an alkaline medium, and separating the resulting 1-propenyl-3-ethoxy-4-hydroxybenzene from the 4-methoxy-compound by recrystallization.

2. Process for producing 1-propenyl-3-ethoxy-4-hydroxy-benzene which comprises ethylating i-chavibetol, subjecting the resulting 3-ethyl-4-methyl ether to the action of an alkaline medium, and separating the resulting 1-propenyl-3-ethoxy-4-hydroxybenzene from the 4-methoxy-compound by the way of their sodium salts.

3. Process for producing 1-propenyl-3-ethoxy-4-hydroxybenzene which comprises ethylating i-chavibetol, subjecting the resulting 3-ethyl-4-methyl ether to the action of an alcoholic alkali metal alcoholate solution and separating the resulting 1-propenyl-3-ethoxy-4-hydroxy-benzene from the 4-methoxy-compound by recrystallization.

4. Process for producing 1-propenyl-3-ethoxy-4-hydroxybenzene which comprises ethylating i-chavibetol, subjecting the resulting 3-ethyl-4-methyl ether to the action of an ethyl alcoholic alkali metal ethyl-alcoholate solution and separating the resulting 1-propenyl-3-ethoxy-4-hydroxy-benzene from the 4-methoxy-compound by recrystallization.

In testimony whereof I affix my signature.

FRIEDRICH BOEDECKER.